United States Patent
Moribe et al.

(10) Patent No.: US 9,796,279 B2
(45) Date of Patent: Oct. 24, 2017

(54) CHARGE AND DISCHARGE SYSTEM FOR VEHICLE WITH INTERLOCK MECHANISM

(71) Applicant: DENSO CORPORATION, Kariya, Aichi-pref. (JP)

(72) Inventors: Nobuo Moribe, Obu (JP); Masashi Shiotani, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 316 days.

(21) Appl. No.: 14/645,840

(22) Filed: Mar. 12, 2015

(65) Prior Publication Data

US 2015/0258904 A1 Sep. 17, 2015

(30) Foreign Application Priority Data

Mar. 17, 2014 (JP) .................. 2014-054121

(51) Int. Cl.
*H01M 10/46* (2006.01)
*B60L 11/18* (2006.01)
(Continued)

(52) U.S. Cl.
CPC ....... *B60L 11/1816* (2013.01); *B60L 11/1812* (2013.01); *B60L 11/1824* (2013.01); *B60L 11/1842* (2013.01); *H02J 7/0031* (2013.01); *H02J 7/0047* (2013.01); *H02J 9/062* (2013.01); *B60L 2230/12* (2013.01); *B60L 2230/16* (2013.01); *H02J 7/0036* (2013.01);
(Continued)

(58) Field of Classification Search
CPC ........ H02J 7/0026; H02J 7/0029; H02J 7/007; H02J 7/02; H02J 7/04; B60L 11/18

USPC ................. 320/104, 109, 128, 135
See application file for complete search history.

(56) References Cited

U.S. PATENT DOCUMENTS 9,216,855 B2 * 12/2015 King ................ B65F 1/16
2013/0082663 A1 4/2013 Mori et al.
(Continued)

FOREIGN PATENT DOCUMENTS

JP 2012-070577 4/2012
JP 2013-099114 4/2013
(Continued)

OTHER PUBLICATIONS

WIPO machine translation of WO 2012/169023 dated Dec. 12, 2012.*
Office Action dated Feb. 23, 2016 in corresponding Japanese Application No. 2014-054121 with English translation.

*Primary Examiner* — Edward Tso
(74) *Attorney, Agent, or Firm* — Harness, Dickey & Pierce, P.L.C.

(57) ABSTRACT

A charge and discharge system for a vehicle includes an electric vehicle having a battery and an inverter, a charge and discharge device having a first relay and a second relay, and a commercial power source. An interlock mechanism is applied to the first relay and the second relay, and the interlock mechanism prevents one of the first relay or the second relay being closed when a remaining one of the first relay or the second relay is in a closed state. The first relay includes two first electric contacts that are normally open and are connected between a branch point and the commercial power source, and the second relay includes two second electric contacts that are normally closed and are connected to the branch point.

8 Claims, 9 Drawing Sheets

(51) Int. Cl.
*H02J 7/00* (2006.01)
*H02J 9/06* (2006.01)

(52) U.S. Cl.
CPC ......... *Y02E 60/721* (2013.01); *Y02T 10/7005* (2013.01); *Y02T 10/7088* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y04S 10/126* (2013.01)

(56) References Cited

U.S. PATENT DOCUMENTS

| | | |
|---|---|---|
| 2013/0106350 A1 | 5/2013 | Ono et al. |
| 2014/0327408 A1 | 11/2014 | Ishii et al. |
| 2015/0015188 A1* | 1/2015 | Ono ................. B60L 11/18 320/107 |

FOREIGN PATENT DOCUMENTS

| | | |
|---|---|---|
| JP | 2013-081290 | 5/2013 |
| JP | 2013-099035 | 5/2013 |
| JP | 2013-099077 | 5/2013 |
| WO | WO2012/169023 | 12/2012 |

\* cited by examiner

FIG. 7A 1ST STEP
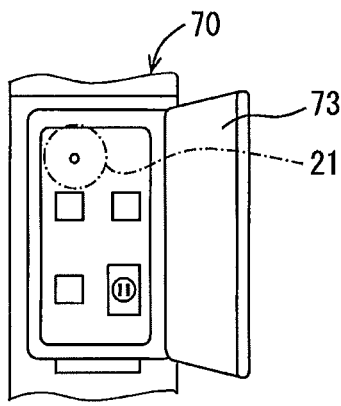
FIG. 7B 2ND STEP
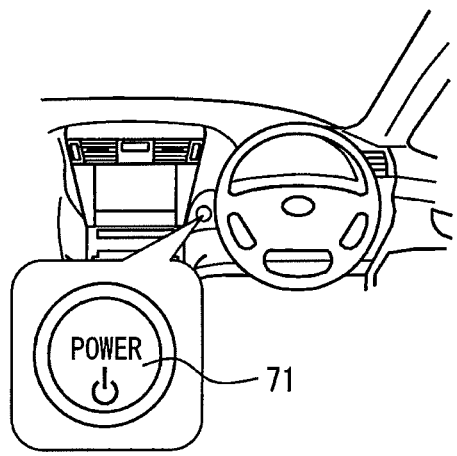
FIG. 7C 3RD STEP
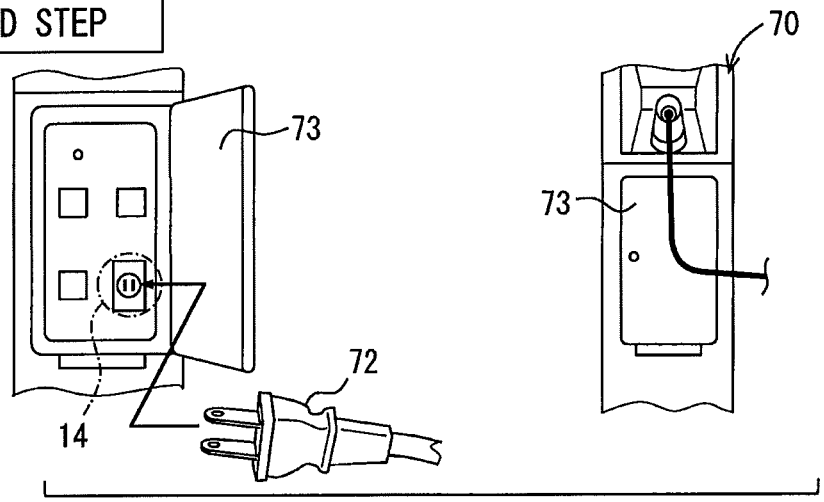

4TH STEP

5TH STEP

6TH STEP   LED ON

DURING DISCHARGE

1ST STEP

2ND STEP

CHARGE AND DISCHARGE SYSTEM FOR VEHICLE WITH INTERLOCK MECHANISM

CROSS REFERENCE TO RELATED APPLICATION

This application is based on Japanese Patent Application No. 2014-054121 filed on Mar. 17, 2014, the disclosure of which is incorporated herein by reference.

TECHNICAL FIELD

The present disclosure relates to a charge and discharge system for a vehicle, which converts direct current (DC) power stored in a vehicle battery to alternating current (AC) power and provides the converted AC power to an external device through a cable when a power supply from a commercial power source is interrupted.

BACKGROUND

As disclosed in JP 2012-070577 A (corresponding to US 2013/0082663 A1), a discharge system discharges DC power stored in a battery of an electric vehicle to an external device. The discharge system disclosed in JP 2012-070577 A is made for improving a safety of power discharge.

The above discharge system includes an electric vehicle equipped with a battery unit and a discharge apparatus that discharges the power stored in the battery unit of the electric vehicle. In the electric vehicle, two switches are disposed in respective power lines and two switching elements are also disposed in respective power lines. Each power line connects a connector to which the discharge apparatus is connected with the battery unit. Each switch switches on the power line according to a permit signal transmitted from the discharge apparatus or a permit signal transmitted from the battery management unit. Each switching element regulates a current that flows through the power line while the battery unit discharges the stored power.

The above discharge system supplies the DC power stored in the battery to the external device. Thus, the DC power output from the battery needs to be converted to AC power using an external inverter that is positioned outside of the vehicle. Accordingly, in the discharge apparatus positioned outside of the vehicle, an inverter needs to be included in a power converter of the discharge apparatus. JP 2012-070577 A does not mention anything about a use of the AC power output from the power converter of the discharge apparatus.

Suppose that the electric vehicle is equipped with an inverter for supplying converted AC power to an external device. In this kind of vehicle, the vehicle battery is charged by a DC power converted from the commercial power, and the DC power stored in the vehicle battery is converted to AC power by the internal inverter and is supplied to the external device. However, the AC power output from the electric vehicle may reversely flow through a power charging path instead of a power discharging path, and the reverse current may adversely affect a stability of the commercial power source, which is also known as a grid power system.

SUMMARY

In view of the foregoing difficulties, it is an object of the present disclosure to provide a charge and discharge system for a vehicle, which supplies AC power stored in a battery of a vehicle to a house for in-house use with a higher safety and a higher reliability in the case of a power supply interruption of a commercial power source caused by an electric outage.

According to a first aspect of the present disclosure, a charge and discharge system for a vehicle includes an electric vehicle, a charge and discharge device, and a commercial power source. The electric vehicle includes a battery storing a direct current power, an inverter converting the direct current power stored in the battery to an alternating current power, a control unit controlling the inverter, and an inlet through which the alternating current power converted in the electric vehicle by the inverter is output. The charge and discharge device is electrically connectable with the electric vehicle through a charge and discharge cable. The charge and discharge device receives the alternating current power supplied by the electric vehicle through the charge and discharge cable when electrically connected to the electric vehicle. The charge and discharge device includes a first relay and a second relay. The commercial power source supplies an alternating current power to the charge and discharge device. A primary side of the first relay is connected to a commercial power source and a secondary side of the first relay is connected to a branch point that is positioned between the charge and discharge cable and the first relay, and a primary side of the second relay is connected to the branch point and the second relay receives the alternating current power supplied by the electric vehicle from the branch point. An interlock mechanism is applied to the first relay and the second relay, and the interlock mechanism prevents one of the first relay or the second relay from being closed when a remaining one of the first relay or the second relay is in a closed state. The first relay includes two first electric contacts that are normally open, the two first electric contacts are connected between the branch point and the commercial power source, the second relay includes two second electric contacts that are normally closed, and the two second electric contacts are connected to the branch point.

With the above system, AC power stored in a battery of a vehicle is supplied to a house for in-house use with a higher safety and a higher reliability in the case of a power supply interruption of a commercial power source caused by an electric outage.

According to a second aspect of the present disclosure, a charge and discharge system for a vehicle includes an electric vehicle, and a charge and discharge device. The electric vehicle includes a battery storing a direct current power, an inverter converting the direct current power stored in the battery to an alternating current power, a control unit controlling the inverter, and an inlet through which the alternating current power converted in the electric vehicle by the inverter is output. The charge and discharge device is electrically connectable with the electric vehicle through a charge and discharge cable. The charge and discharge device receives the alternating current power supplied by the electric vehicle through the charge and discharge cable when electrically connected to the electric vehicle. The charge and discharge device includes a first relay and a second relay. A primary side of the first relay is connected to a commercial power source that supplies an alternating current power to the charge and discharge device and a secondary side of the first relay is connected to a branch point that is positioned between the charge and discharge cable and the first relay. A primary side of the second relay is connected to the branch point, and the second relay receives the alternating current power supplied by the electric vehicle from the branch point. An interlock mechanism is applied to the first relay and the second relay, and the interlock mechanism prevents one of the first relay or the second relay from being closed when a remaining one of the first relay or the second relay is in a closed state. The first relay includes two first electric contacts that are normally open, the two first electric contacts are connected between the branch point and the commercial power source, the second relay includes two second electric contacts that are normally closed, and the two second electric contacts are connected to the branch point.

With the above system, advantages similar to the advantages provided by the charge and discharge system according to the first aspect can be provided.

BRIEF DESCRIPTION OF THE DRAWINGS

The above and other objects, features and advantages of the present disclosure will become more apparent from the following detailed description made with reference to the accompanying drawings. In the drawings:

FIG. 7A to FIG. 7C are diagrams showing a part of operation procedures for setting the system to a self-supply mode according to the above embodiment;

DETAILED DESCRIPTION

Figure 1:
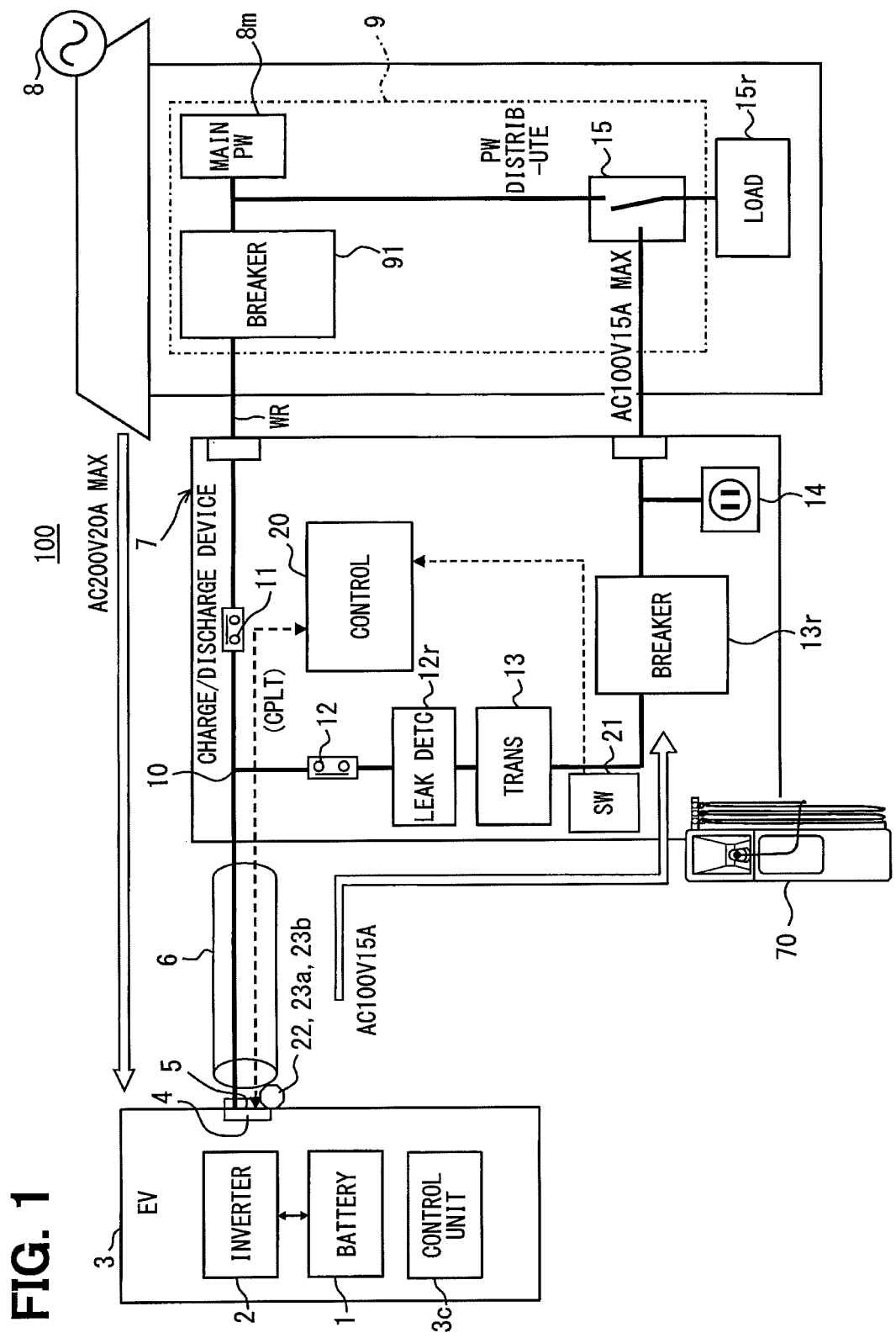
FIG. 1 is a diagram showing a configuration of a charge and discharge system for a vehicle according to a first embodiment of the present disclosure.

The following will describe embodiments of the present disclosure with reference to the drawings. In each of the following embodiments, the same reference number is added to the same or equivalent parts in the drawings. In each of the following embodiments, when only a part of a configuration, instead of all of the configurations, is described, the other part of the configuration may have a similar or the equivalent configuration with which is previously described in the foregoing embodiments.

As well as a combination of some portions specifically described in each embodiment, it is also possible to partially combine embodiments, as long as there is no particular impediment to the combination.

First Embodiment

The following will describe a first embodiment of the present disclosure with reference to FIG. 1 to FIG. 9B. FIG. 1 is a diagram showing an entire configuration of a charge and discharge system 100 for a vehicle according to the first embodiment of the present disclosure. As shown in FIG. 1, the charge and discharge system 100 includes a vehicle 3 and a charge and discharge device (CHARGE/DISCHARGE DEVICE) 7. The vehicle 3 is provided by an electric vehicle (EV) as an example. The electric vehicle 3 includes a battery 1, an inverter 2, and a control unit 3c. The battery 1 stores DC power, and the inverter 2 converts the DC power stored in the battery 1 to AC power within the electric vehicle 3. Thus, the electric vehicle 3 also functions as an electric generator. The electric vehicle 3 further includes an inlet 4. The electric vehicle 3 is able to be connected to the charge and discharge device 7 via a charge and discharge cable 6. The charge and discharge cable 6 has a connector 5 at one end, which is to be connected to the inlet 4 of the electric vehicle 3. The AC power source supplied by the battery 1 of the electric vehicle 3 is used as a self-supply AC power source different from the AC power source supplied by the commercial power source 8. In the case of emergency, such as interruption of the commercial power source 8, power can be supplied by the self-supply AC power source of the electric vehicle 3.

The electric vehicle 3 may include an electric vehicle driven by a motor and a plug-in hybrid vehicle driven by one of a motor or an engine. The electric vehicle 3 may also include a range extender vehicle in which an engine generates electric power to drive a motor so that driving power is provided to the vehicle. The battery 1 of the electric vehicle 3 can be charged by the power supplied from the commercial power source 8.

The AC power output from the electric vehicle 3 is transferred to the charge and discharge device 7 through the inlet 4, the connector 5, and the charge and discharge cable 6. The charge and discharge device 7 may be disposed inside of a charge and discharge stand 70 disposed in a parking space as shown in FIG. 1.

The house includes a power distribution board (PW DISTRIBUTE) 9 disposed inside of the house. The power distribution board 9 transfers the AC power supplied by the commercial power source 8 to the charge and discharge device 7.

The charge and discharge device 7 includes a first relay 11 and a second relay 12. A primary side of the first relay 11 is connected with the power distribution board 9 in order to receive AC power transferred from the power distribution board 9. A secondary side of the first relay 11 is connected with a branch point 10 disposed between the charge and discharge cable 6 and the first relay 11. A primary side of the second relay 12 is connected with the branch point 10 for receiving power from the branch point 10.

The first relay 11 and the second relay 12 are provided by single electromagnetic switch. The first relay 11 and the second relay 12 is equipped with an interlock mechanism as shown by a chain line in FIG. 3. The interlock mechanism prevents electric contacts of either relay 11, 12 from being closed when electric contacts of the other relay 11, 12 are in closed states. This kind of electromagnetic switch is available in the market. For example, the interlock mechanism of the electromagnetic switch may be provided by a mechanical interlock structure. Specifically, on state and off state of each of the first relay 11 and the second relay 12 are switched corresponding to a conducting or non-conducting of an electromagnetic coil C1, respectively.

The charge and discharge device 7 further includes an insulated transformer (TRANS) 13. A primary side of the insulated transformer 13 is connected to a secondary side of the second relay 12 in order to receive power from the second relay 12, and one end of a secondary side of the insulated transformer 13 is grounded.

The charge and discharge device 7 further includes an electric outlet 14 for supplying the self-supply AC power output from the electric vehicle 3 for home use. Hereinafter, the electric outlet 14 for supplying the self-supply AC power output from the electric vehicle 3 is also referred to as self-supply power electric outlet 14. The self-supply power electric outlet 14 is connected between the secondary side of the insulated transformer 13 and the ground.

The power distribution board 9 includes a manual switch 15 for selecting the power source of in-house electric loads (LOAD) 15r between the commercial power source 8 and the self-supply power source from the electric vehicle 3. The manual switch 15 connects the in-house electric loads (LOAD) 15r to the secondary side of the insulated transformer 13 or to the commercial power source 8 according to a manipulation made by a user.

The power distribution board 9 is provided by an in-house power source device that supplies the AC power transferred from the commercial power source 8 for home use. The commercial power source 8 is a power source provided by an electric power company, and is also known as a grid power system. The charge and discharge system 100 may further include the commercial power source 8.

As shown in FIG. 1, an AC wire WR is connected between the power distribution board 9 and the branch point 10 through the first relay 11. A single-phase two-wire self-supply AC power, which is output from the electric vehicle 3, is supplied to the branch point 10. Further, the single-phase two-wire self-supply AC power is transferred to the self-supply power electric outlet 14 and is further transferred to the power distribution board 9 through the insulated transformer 13 as shown by an arrow 7PS shown in FIG. 3 and FIG. 4. Since one end of the secondary side of the insulated transformer 13 is grounded, the single-phase two-wire self-supply AC power transferred to the self-supply power electric outlet 14 and the power distribution board 9 has one wire being grounded. The single-phase two-wire self-supply AC power having one grounded wire is transferred through the wires A, B shown in FIG. 3 and FIG. 4.

The charge and discharge device 7 is housed in the charge and discharge stand 70, and the charge and discharge cable 6 is connected with the charge and discharge stand 70. The charge and discharge stand 70 includes an operation switch (SW) 21 provided inside of the charge and discharge stand 70. The user may operate the operation switch 21 to switch an operation mode of the charge and discharge device 7 between a self-supply mode and an ordinary mode.

The self-supply mode is an operation mode in which the AC power output from the electric vehicle 3 is supplied to an external device through the charge and discharge cable 6. The ordinary mode is an operation mode in which the AC power output from the commercial power source 8 is charged to the electric vehicle 3 through the charge and discharge cable 6.

The charge and discharge device 7 further includes a controller (CONTROL) 20. When the operation switch 21 receives a signal indicating an operation mode switch in response to an operation made by the user, the operation switch 21 transmits the signal to the controller 20 of the charge and discharge device 7. Then, the controller 20 controls on states and off states of the first relay 11 and the second relay 12 based on the received signal.

In a case where (i) the first relay 11 is welded and keeps working in the on state and (ii) the AC power converted by the inverter 2 of the electric vehicle 3 within the electric vehicle 3 is transferred from the electric vehicle 3 to the branch point 10 through the charge and discharge cable 6, the AC power provided at the branch point 10 may adversely affect the grid power through the first relay 11 that keeps working in on state.

Figure 3:
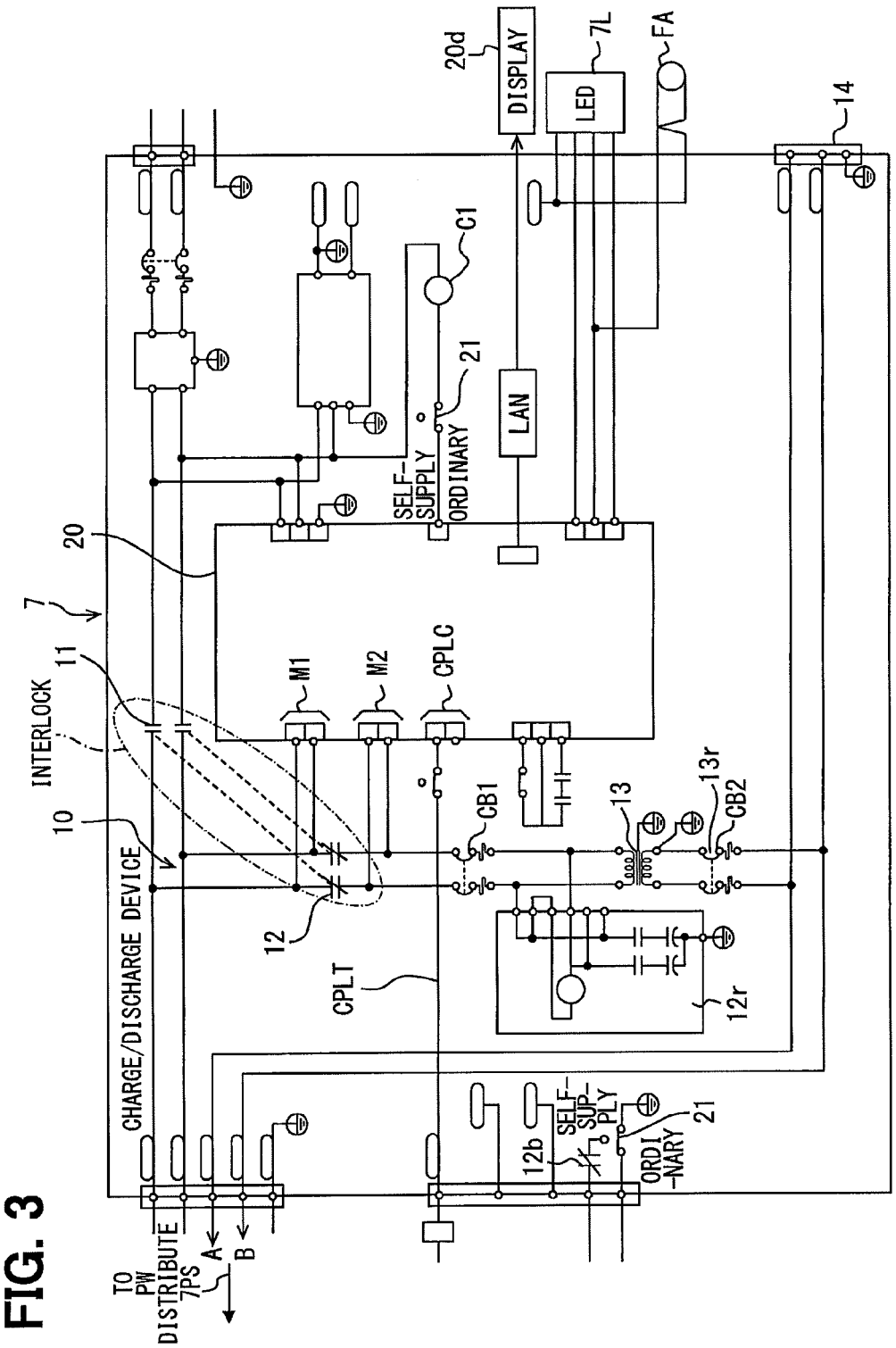
FIG. 3 is a circuit diagram showing a configuration of the charge and discharge device according to the above embodiment.

As shown in FIG. 3, the first relay 11 includes two first electric contacts, which are normally open. When the first relay 11 is welded and keeps working in the on state, the second relay 12 is forced to keep the off state under the control of the mechanical interlock. When the first relay 11 is in welded state, it is better to prevent the AC power output from the electric vehicle 3 being transferred to the power distribution board 9 even when the self-supply mode is selected by the operation switch 21. Accordingly, a discharge command interlock is applied to the second relay 12. The discharge command interlock prevents the electric vehicle 3 from outputting the AC power in response to the selection of the self-supply mode while the first relay 11 is welded and keeps on state. Specifically, the second relay 12 includes an auxiliary electric contact 12b as the discharge command interlock. When the auxiliary electric contact 12b is in an off state, even though the operation switch 21 selects the self-supply mode, a discharge command for switching to the self-supply mode cannot be transferred to the connector 5. Thus, during the off state of the auxiliary electric contact 12b, even though the operation switch 21 is operated by the user to select the self-supply mode and the discharge start switch 22 is operated by the user to start the discharge of the electric vehicle 3, the discharge of the electric vehicle 3 cannot be activated.

The AC power transferred from the commercial power source 8 is converted to an AC power having a voltage of 200 volts and a maximum alternating current of 20 amperes by the power distribution board 9, and is supplied to the electric vehicle 3 for charging.

The charge and discharge cable 6 is connectable to the inlet 4 of the electric vehicle 3 by the connector 5. The connector 5 is also referred to as a charge and discharge connector 5.

The operation switch 21 is disposed in the charge and discharge device 7. The operation switch 21 switches the operation mode of the system to the self-supply mode or to the ordinary mode according to an operation made by the user. As shown in FIG. 3, according to the operation made by the user to the operation switch 21, the controller 20 controls on state and off state of the electromagnetic coil C1 of the electromagnetic switch to turn on or turn off the first relay 11 and the second relay 12. As described above, the electromagnetic switch provides the first relay 11 and the second relay 12.

When the operation switch 21 selects the ordinary mode, an electromagnetic coil interlock is applied to the electromagnetic coil C1 so that the electromagnetic coil C1 is excited.

Figure 5:
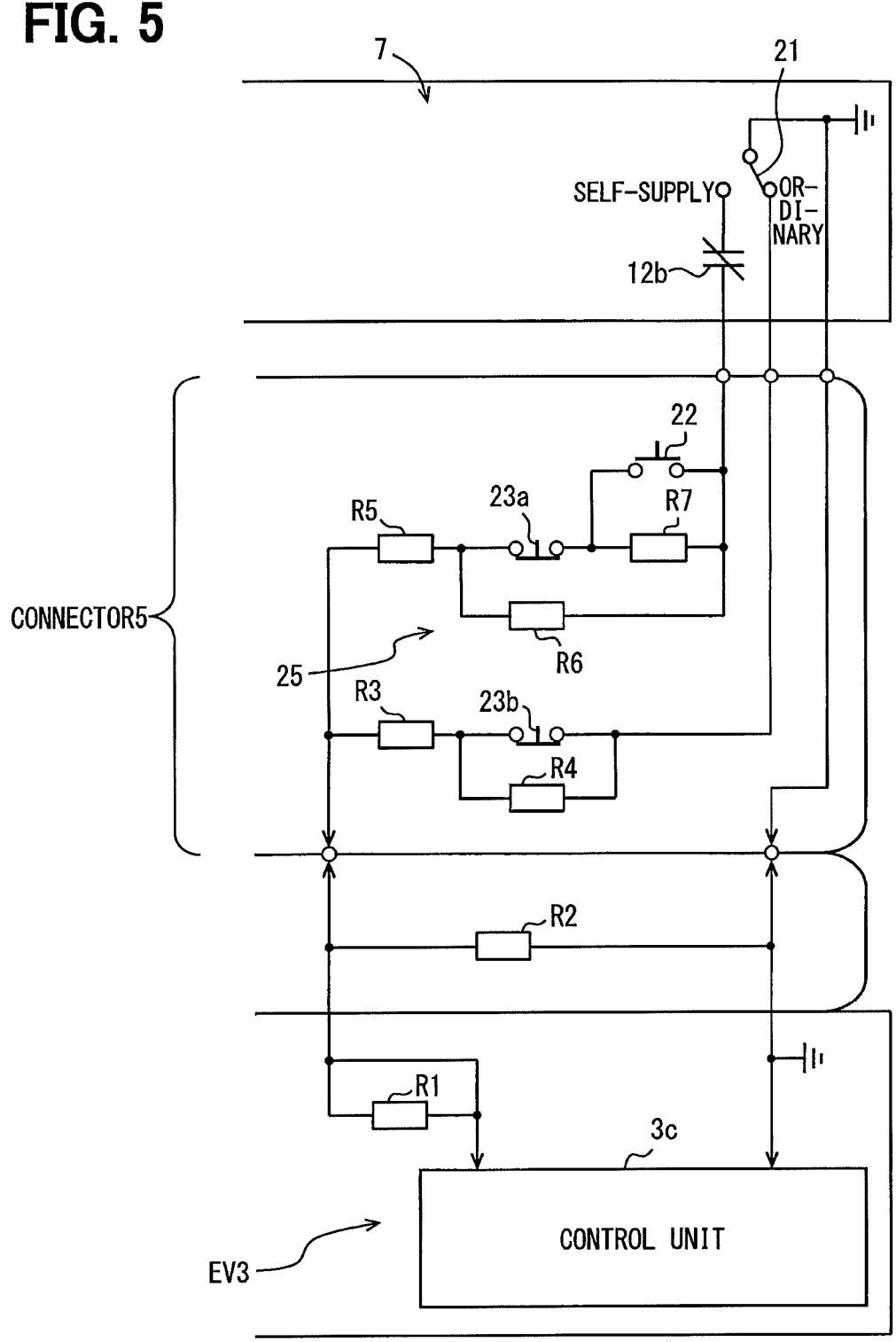
FIG. 5 is a circuit diagram showing a configuration of a voltage convert circuit included in a connector according to the above embodiment.
Figure 8B:
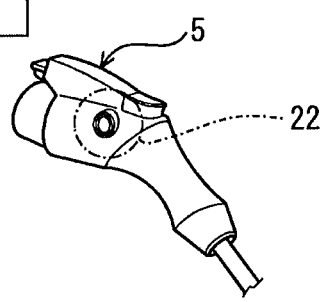
Figure 9A:
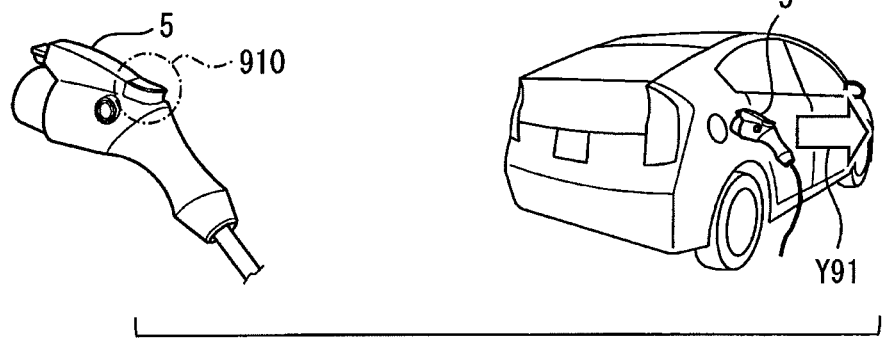
FIG. 9A and FIG. 9B are diagrams showing operation procedures for ending the self-supply mode according to the above embodiment.

The connector 5 is connected at one end of the charge and discharge cable 6, which is to be connected to the electric vehicle 3. The connector 5 has a gun shape as shown in FIG. 8B and FIG. 9A. As shown in FIG. 5, the connector 5 includes the discharge start switch 22 to be operated by the user. The connector 5 further includes attachment detection switches 23a, 23b, each of which detects a locked attachment of the connector 5 to the inlet 4. Specifically, when the connector 5 is attached to the inlet 4 without being locked, the attachment detection switches 23a, 23b stay in open state, and when the connector 5 is attached to the inlet 4 and is locked after the attachment, the attachment detection switches 23*a*, 23*b* are closed.

Figure 2:
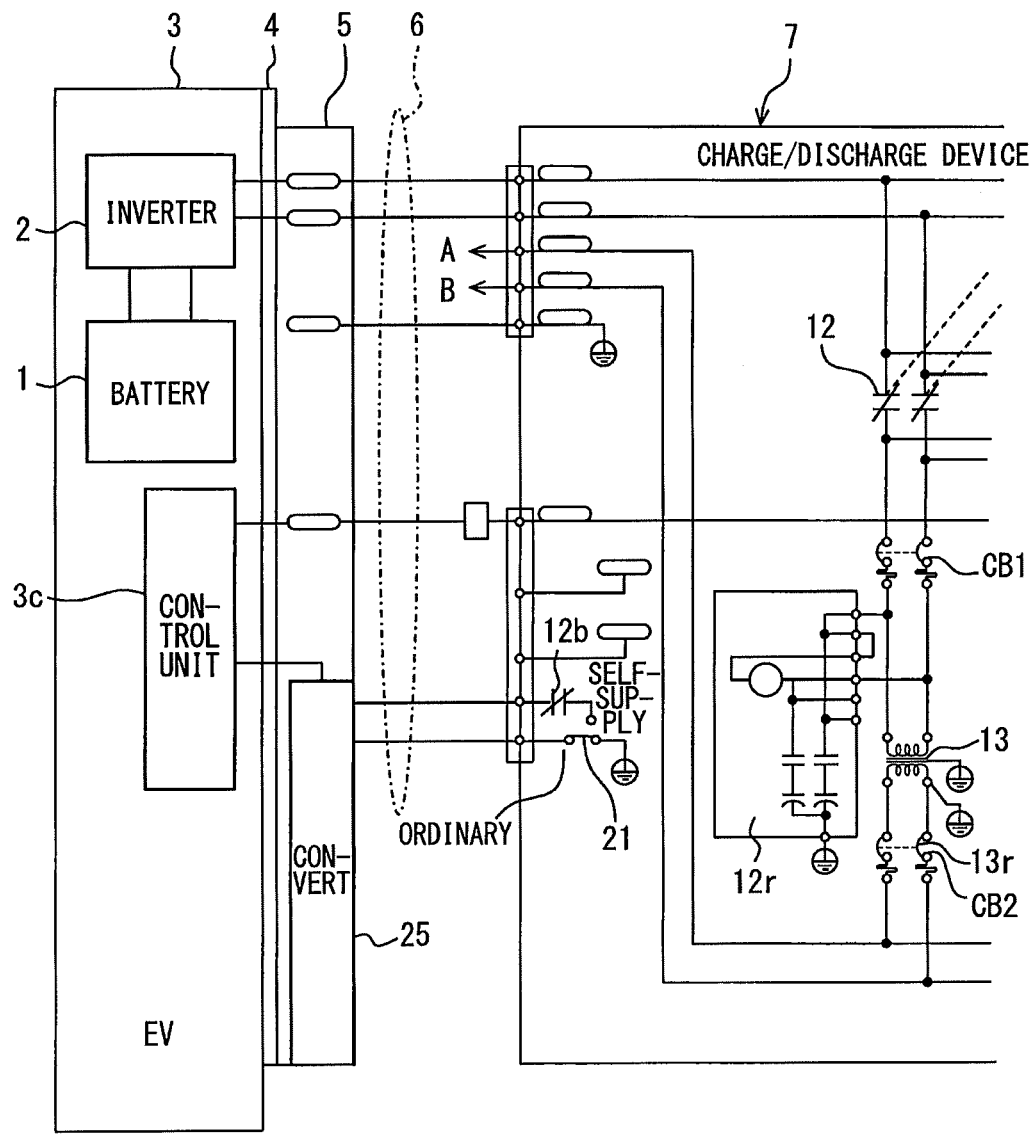
FIG. 2 is a circuit diagram showing partial configurations of an electric vehicle, a charge and discharge cable, and a charge and discharge device according to the above embodiment.

As shown in FIG. 2 and FIG. 5, the connector 5 includes a voltage convert circuit (CONVERT) 25. When the operation switch 21 selects the self-supply mode and the auxiliary electric contact 12*b* of the second relay 12 is in the on state, the voltage convert circuit 25 is connected to the earth. Accordingly, an operation state of the discharge start switch 22 and operation states of the attachment detection switches 23*a*, 23*b* can be indicated by voltage signals, and the voltage signals are output to the control unit 3*c* of the electric vehicle 3. Herein, the voltage signals indicating the operation states are converted by the voltage convert circuit 25, and the operation state of each of the discharge start switch 22 and the attachment detection switches 23*a*, 23*b* is one of the on state or off state. In FIG. 5, resistors R1, R2 are connected to the control unit 3*c* of the electric vehicle 3, and resistors R3 to R7 are included in the connector 5.

The following will describe further detailed portions of the present embodiment with reference to FIG. 1 to FIG. 5.

As shown in FIG. 1 or FIG. 3, an electric leakage detector (LEAK DETC) 12*r* is provided between the branch point 10 and the insulated transformer 13. The electric leakage detector 12*r* is also known as a grounding fault detector. The electric leakage detector 12*r* detects an electric leakage of a circuit at the secondary side of the second relay 12, and transmits a signal indicating the electric leakage to the controller 20 to turn off the second relay 12.

Further, an earth leakage breaker (BREAKER) 13*r* is connected at the secondary side of the insulated transformer 13. The earth leakage breaker 13*r* also has an overcurrent protection function. As shown in FIG. 2, the earth leakage breaker 13*r* includes a circuit breaker CB2 that is able to interrupt the electric leakage.

The commercial power source 8 shown in FIG. 1 supplies single-phase three-wire AC power for the home use as a main power source (MAIN PW) 8*m*. The main power source 8*m* supplies power to the power distribution board 9. The power distribution board 9 supplies power to multiple power lines included in the house via respective circuit breakers. As shown in FIG. 1, the power distribution board 9 receives power from the commercial power source 8, and transfers the received power to the charge and discharge device 7 via an earth leakage breaker (BREAKER) 91 having the overcurrent protection function during charging of the electric vehicle 3. Herein, the power supplied by the commercial power source 8 for charging purpose has a voltage of 200 volts and maximum alternating current of 20 amperes.

Figure 4:
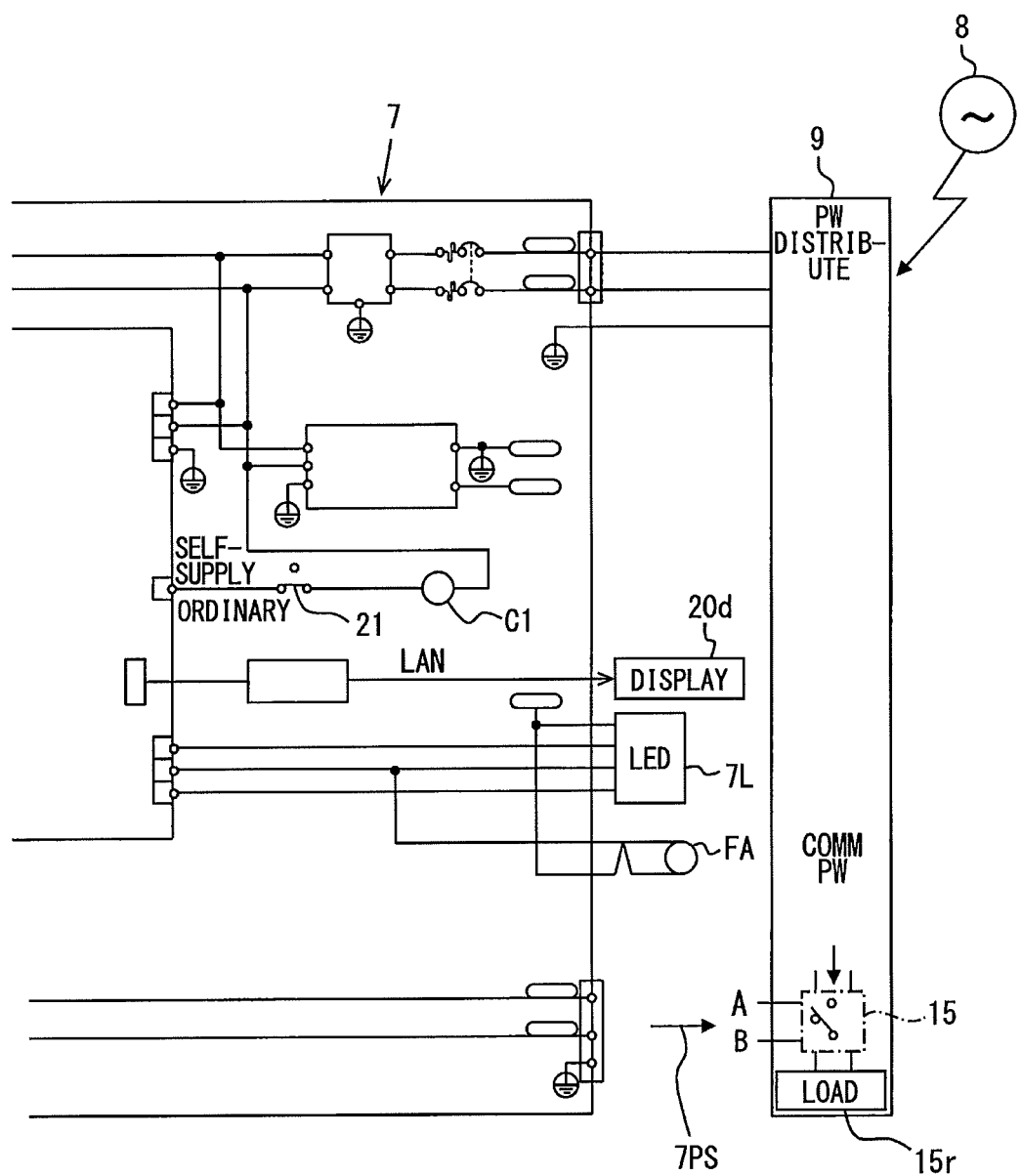
FIG. 4 is a circuit diagram showing partial configurations of the charge and discharge device and a power distribution board according to the above embodiment.

FIG. 2 to FIG. 4 show partial circuit diagrams of the electric configuration shown in FIG. 1. As shown in FIG. 3, the charge and discharge device 7 includes the controller 20. The second relay 12 is also referred to as a discharge relay. As shown in FIG. 3, lines M1 for monitoring the charge and discharge operation are connected between the controller 20 and the charge and discharge line. Lines M2 for monitoring an output of the second relay 12 are connected between the controller 20 and the secondary side of the second relay 12. Further, a line for transmitting a control pilot signal (CPLT) to the electric vehicle 3 is connected between the electric vehicle 3 and the controller 20. Further, grounding fault signals detected by the circuit breakers CB1, CB2 are input to the controller 20. The earth leakage breaker 13*r* has the overcurrent protection function. The earth leakage breaker 13*r* is integrated with the circuit breakers CB2 as one piece. When the system 100 switches to the self-supply mode, the control pilot signal is prevented from being transmitted to the electric vehicle 3, and the electric vehicle 3 can understand that the operation mode is no longer in the ordinary mode. As described above, during the ordinary mode, the electric vehicle 3 is charged by the power supplied by the commercial power source 8.

As shown in FIG. 3, the controller 20 turns on the electromagnetic coil C1 of the electromagnetic switch, which provides the first relay 11 and the second relay 12. The controller 20 is connected with an in-house controller (not shown) by a multiplex communication circuit LAN. The in-house controller includes a display device (DISPLAY) 20*d*. The controller 20 also supplies power to a light emitting diode (LED) 7L or a cooling fan FA for controlling these elements.

The following will describe the charge and discharge system 100 according to the present embodiment from a point of view of actual use by the user.

Figure 6A:
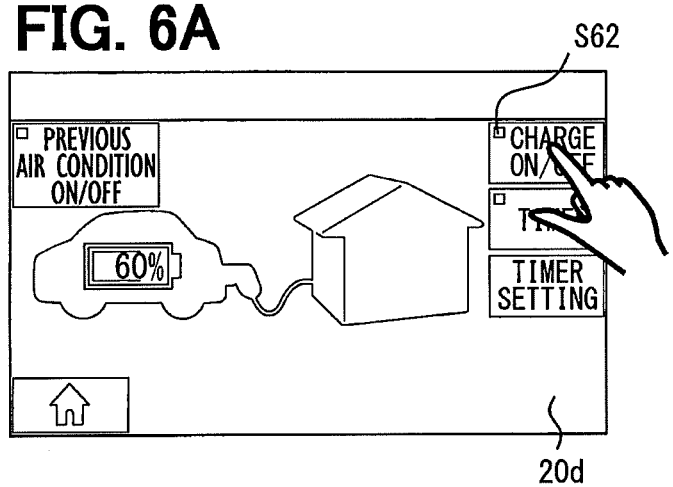
FIG. 6A to FIG. 6C are diagrams showing operation procedures for setting the system to an ordinary mode according to the above embodiment.
Figure 6B:
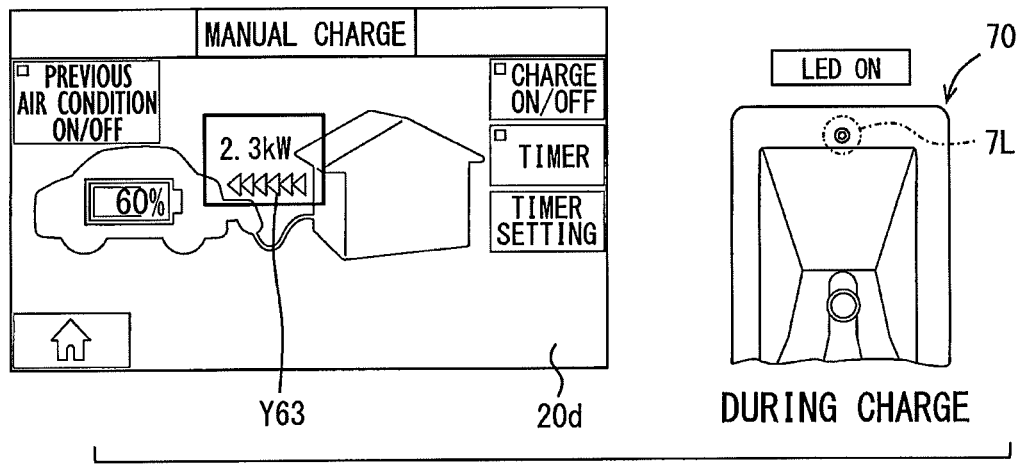
Figure 6C:
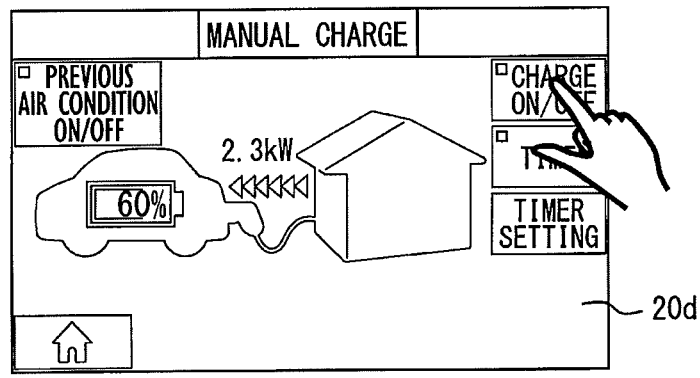

The following will describe charging of the electric vehicle 3 with reference to FIG. 6A to FIG. 6C. FIG. 6A to FIG. 6C show operations made by the user in order to start or end a charging of the electric vehicle 3. As shown in FIG. 6A, when starting the charging of the electric vehicle 3, at first, the charge and discharge connector 5 is confirmed whether to be properly attached to the electric vehicle 3. Then, the user sets the charging of the electric vehicle 3 to on state by touching a charge ON/OFF button displayed on the display device 20*d*.

When the charging of the electric vehicle 3 is turned on, as shown in FIG. 6B, a text message indicating manual charge is displayed on the display device 20*d*. Further, on the display device 20*d*, an arrow Y63 pointing to the electric vehicle 3 is displayed during the charging of the electric vehicle 3. Further, during the charge, the LED 7L disposed on an upper portion of the charge and discharge stand 70 is in on state. In the present embodiment, the LED has orange color during the charge as an example. When the capacity of the vehicle battery 1 becomes full, the charge is ended automatically. When the user wants to end the charge in the middle, as shown in FIG. 6C, the user sets ends the charging by touching the charge ON/OFF button displayed on the display device 20*d*.

The following will describe a power discharge from the electric vehicle 3 with reference to FIG. 7A to 8C.

Specifically, the following will describe a case in which the operation mode of the system switches from the ordinary mode to the self-supply mode. Herein, self-supply mode indicates the discharge mode of the battery 1 of the electric vehicle 3. As shown in FIG. 7A, firstly, the user unlocks and opens a lid 73 of the charge and discharge stand 70, and operates the operation switch 21 positioned on left upper portion of a panel provided in the charge and discharge stand 70 for switching the ordinary mode to the self-supply mode. Herein, ordinary mode indicates the charge mode of the battery 1 of the electric vehicle 3. During the self-supply mode, the electric vehicle 3 discharges AC power stored in the battery 1 and transferred the discharged AC power to the charge and discharge device 7.

As shown in FIG. 7B, secondly, the user presses a power switch 71 of the electric vehicle 3 by twice without stepping on the pedal to turn on the power switch 71.

As shown in FIG. 7C, thirdly, the user inserts a plug of an electric appliance to the self-supply power electric outlet 14 of the charge and discharge stand 70, and closes and locks the lid 73. A space is defined between a lower portion of the lid 73 and the main body of the charge and discharge stand 70 so that the cable connected to the plug of the electric appliance can pass through the space.

Figure 8A:
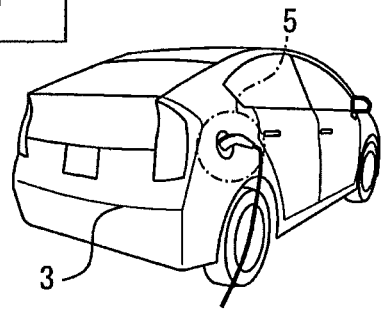
FIG. 8A to FIG. 8C are diagrams showing remaining part of the operation procedures for setting the system to the self-supply mode according to the above embodiment.

As shown in FIG. 8A, fourthly, the user opens a lid of the inlet 4 of the electric vehicle 3, and inserts the connector 5 to the inlet 4. In the present embodiment, the inlet 4 is positioned at a right rear portion of the electric vehicle 3.

As shown in FIG. 8B, fifthly, the user continuously presses the discharge start switch 22 of the connector 5 by twice. In the present embodiment, the discharge start switch 22 is positioned at a side portion of the connector 5. When a period of time, which is approximately equal to 13 seconds, has elapsed after pressing the discharge start switch 22, the LED 7L is switches from a blinking state to on state. The LED 7L also functions as a charging indicator.

Figure 8C:
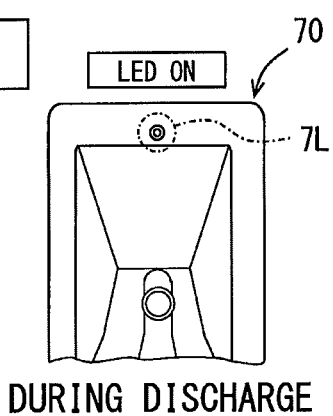

As shown in FIG. 8C, sixthly, when the electric vehicle 3 properly starts to discharge power, the color of the LED 7L of the charge and discharge stand turns blue to indicate the discharging state.

Figure 9B:
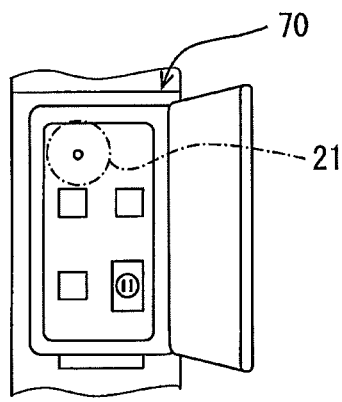

The following will describe how to end the power discharge of the electric vehicle 3 with reference to FIG. 9A and FIG. 9B.

As shown in FIG. 9A, firstly, the user removes the connector 5 from the inlet 4 of the electric vehicle 3 in a direction shown by an arrow Y91 with a lock release button 910 being pressed, and places back the connector 5 to the charge and discharge stand 70. Further, in some cases, the user needs to put the electric appliance away neatly.

As shown in FIG. 9B, secondly, the user operates the operation switch 21 to switch the operation mode from the self-supply mode to the ordinary mode in order to end the power discharge state.

The following will describe advantages provided by the present embodiment. In the present embodiment, the electric vehicle 3 includes the battery 1 that stores DC power, the inverter 2 that converts the DC power stored in the battery 1 to the AC power. The AC power output from the electric vehicle 3 is transferred to the charge and discharge device 7 through the inlet 4 of the electric vehicle 3, the connector 5, and the charge and discharge cable 6. The connector 5 is connected at one end of the charge and discharge cable 6, and the charge and discharge cable 6 is connected to the charge and discharge device 7.

The power distribution board 9 is provided in the house for supplying the AC power transferred from the commercial power source 8 to the in-house electric loads 15r and to the electric vehicle 3.

The charge and discharge device 7 includes the first relay 11 whose primary side is connected to the AC power source supplied by the power distribution board 9. The secondary side of the first relay 11 is connected to the branch point 10 disposed between the charge and discharge cable 6 and the first relay 11. The charge and discharge device 7 further includes the second relay 12. The second relay receives AC power supplied by the electric vehicle 3 from the branch point 10. The first relay 11 and the second relay 12 are provided by single switchable electromagnetic switch, such as a bipolar double-throw switch. The electromagnetic switch is equipped with the interlock mechanism that prevents one of the first relay 11 or the second relay 12 from being closed when a remaining one of the first relay 11 or the second relay 12 is in a closed state.

The insulated transformer 13 receives power from the secondary side of the second relay 12, and one wire of the secondary side of the insulated transformer 13 is grounded. The self-supply power electric outlet 14 is connected with the secondary side of the insulated transformer 13.

With above-described configuration, the first relay 11 and the second relay 12 are under a control of the interlock mechanism so that when one of the first relay 11 or the second relay 12 is in the closed state, the other one of the first relay 11 or the second relay 12 is prevented from being closed. Thus, the AC power supplied by the commercial power source 8 can keep independent from the AC power supplied by the electric vehicle 3. Further, the electric vehicle 3 can be charged by the AC power supplied by the commercial power source 8 through the charge and discharge cable 6, and the AC power supplied by the electric vehicle 3 can also be provided to the electric loads 15r through the charge and discharge cable 6. Thus, when a power supply from the commercial power source 8 is interrupted, for example, caused by an electric outage during an occurrence of a disaster, the electric vehicle 3 may function as an electric generator and is able to independently supply the AC power to the electric loads 15r.

In the present embodiment, the first relay 11 includes two first electric contacts that are normally open, the two first electric contacts are connected between the branch point 10 and the commercial power source 8, the second relay 12 includes two second electric contacts that are normally closed, and the two second electric contacts are connected to the branch point 10.

Thus, when a power supply from the commercial power source 8 is interrupted, for example, caused by an electric outage during an occurrence of a disaster, the AC power supplied by the electric vehicle 3 may be supplied for home use by closing two second electric contacts of the second relay 12. At this time, since the two first electric contacts of the first relay 11 are in the open state, the AC power supplied by the electric vehicle 3 is prevented from flowing reversely through the charging path. Thus, the AC power supplied by the electric vehicle 3 can be transferred to the house for home use with a higher safety and a higher reliability.

When the AC power supplied by the electric vehicle 3 flows reversely through the charging path caused by a malfunction, a stability of the grid power system may be adversely affected by the reverse AC power from the electric vehicle 3. In the present embodiment, since the reverse flow of the AC power from the electric vehicle 3 to the grid power system through the charging path is restricted, the stability of the grid power system can be secured.

In the present embodiment, the AC power supplied by the commercial power source 8 is transferred to the power distribution board 9, and the power distribution board 9 functions as an in-house power source device. The AC wire WR is connected between the power distribution board 9 and the branch point 10 through the first relay 11. The single-phase two-wire self-supply AC power, which is output from the electric vehicle 3, is transferred to the branch point 10. The single-phase two-wire self-supply AC power is further transferred to the self-supply power electric outlet 14 and the power distribution board 9 through the insulated transformer 13. Since one end of the secondary side of the insulated transformer 13 is grounded, the single-phase two-wire self-supply AC power having one wire being grounded is transferred to the self-supply power electric outlet 14 and to the power distribution board 9.

In the present embodiment, electric loads 15r include the in-house power source device to which the AC power supplied by the commercial power source 8 is transferred. The in-house power source device includes the power distribution board 9, and the AC power from the commercial power source 8 is transferred to the branch point 10 through the power distribution board 9 and the first relay 11. Thus, the electric vehicle 3 can be charged by the commercial power source 8 included in the in-house power source device through the charge and discharge cable 6. The AC power output from the electric vehicle 3 is a single-phase two-wire AC power which is in a floating state. The AC power output from the electric vehicle 3 is transferred to the self-supply power electric outlet 14 and to the power distribution board 9 through the insulated transformer 13. Since one end of the secondary side of the insulated transformer 13 is grounded, the single-phase two-wire AC power output from the insulated transformer 13 has one wire being grounded. Thus, the single-phase two-wire self-supply AC power having one wire being grounded is be transferred to the self-supply power electric outlet 14 and to the power distribution board 9. Further, the floating state of the AC power output from the electric vehicle 3 can be suppressed, and the single-phase two-wire self-supply AC power source which is in general use can be transferred to the self-supply power electric outlet 14 and the power distribution board 9. With this configuration, when the commercial power source 8 for home use is out of service, the self-supply power electric outlet 14 or the power distribution board 9 can be supplied with single-phase two-wire self-supply AC power having a voltage of 100 volts and the maximum alternating current of 15 amperes from the electric vehicle 3. Thus, the power source for home use can be secured even when the commercial power source 8 is out of service during, for example, an occurrence of a disaster.

The operation signal of the operation switch 21 is transmitted to the controller 20 of the charge and discharge device 7, and the controller 20 controls the first relay 11 and the second relay 12 based on the operation signal of the operation switch 21.

With above-described configuration, the first relay 11 and the second relay 12 can be controlled by operating the operation switch 21 of the charge and discharge stand 70. Thus, after taking out the charge and discharge cable 6 from the charge and discharge stand 70, the user can easily select one of the commercial power source or the self-supply AC power source by operating the operation switch 21 for supplying the power to the electric loads 15r.

When the electromagnetic coil C1 is turned on, the first electric contacts included in the first relay 11 become closed (turn on) and the second electric contacts included in the second relay 12 become open (turn off). As shown in FIG. 3, when the operation switch 21 selects the ordinary mode, the electromagnetic coil interlock is applied to the electromagnetic coil C1 so that the electromagnetic coil C1 is excited. Further, when the operation switch 21 selects the self-supply mode, the electromagnetic coil interlock forces the electromagnetic coil C1 to maintain the off state.

With above-described configuration, when the operation switch 21 does not select the ordinary mode, the electromagnetic coil C1 is not excited, that is in the off state. Thus, the AC power supplied by the commercial power source 8 cannot be transferred to the branch point 10 by the power distribution board 9. Thus, the AC power source supplied by the electric vehicle 3 can be avoided to be electrically coupled with the AC power supplied by the commercial power source 8.

As shown in FIG. 5, the connector 5 includes the discharge start switch 22 that is operated by the user. Thus, after properly attaching the connector 5 to the inlet 4 of the electric vehicle 3, the user can easily start the discharge of the battery 1 included in the electric vehicle 3 by operating the discharge start switch 22. The connector 5 further includes the connector attachment detection switches 23a, 23b. The connector attachment detection switches 23a, 23b maintain off states when the connector 5 is attached to the inlet 4 without being locked, and switches to on states when the connector 5 is locked after being attached to the inlet 4.

When (i) the operation switch 21 selects the self-supply mode, (ii) the connector attachment detection switches 23a, 23b detect that the connector 5 is properly attached to the inlet 4 and is locked, and (iii) the discharge start switch 22 is operated by the user, a discharge start command is output from the discharge start switch 22 and is converted to a voltage signal by the voltage convert circuit 25 included in the connector 5. Then, the voltage convert circuit 25 transmits the voltage signal to the electric vehicle 3. Thus, the electric vehicle 3 switches the operation mode to the self-supply mode when receiving, from the discharge start switch 22, the voltage signal, which is converted based on the discharge start command.

Other Embodiments

In the foregoing embodiment, the self-supply power electric outlet 14 is included in the charge and discharge device 7, which is housed in the charge and discharge stand 70. As another example, the self-supply power electric outlet 14 may be positioned outside of the charge and discharge stand 70 or inside of the house. As another example, a discharge path from the electric vehicle 3 may be connected to the commercial power source 8 at an upper stream of an in-house main breaker. With this configuration, the power for home use can be selected by a selection switch between the commercial power source 8 and the discharge power supplied by the electric vehicle 3.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A charge and discharge system for a vehicle comprising:
    an electric vehicle including:
        a battery storing a direct current power;
        an inverter converting the direct current power stored in the battery to an alternating current power;
        a control unit controlling the inverter; and
        an inlet through which the alternating current power converted by the inverter is output;
    a charge and discharge device electrically connectable with the electric vehicle through a charge and discharge cable, wherein the charge and discharge device receives the alternating current power supplied by the electric vehicle through the charge and discharge cable when electrically connected to the electric vehicle, and the charge and discharge device includes a first relay and a second relay; and
    a commercial power source supplying an alternating current power to the charge and discharge device, wherein
    a primary side of the first relay is connected to the commercial power source and a secondary side of the first relay is connected to a branch point that is positioned between the charge and discharge cable and the first relay, a primary side of the second relay is connected to the branch point, and the second relay receives the alternating current power supplied by the electric vehicle from the branch point, and an interlock mechanism is applied to the first relay and the second relay, and the interlock mechanism prevents one of the first relay or the second relay from being closed when a remaining one of the first relay or the second relay is in a closed state, wherein the first relay includes two first electric contacts that are normally open, the two first electric contacts are connected between the branch point and the commercial power source, the second relay includes two second electric contacts that are normally closed, and the two second electric contacts are connected to the branch point, and wherein the first relay is closed during a charge of the battery included in the electric vehicle with the commercial power source, and the second relay is closed during a discharge of the battery included in the electric vehicle to the external electric loads.

2. The charge and discharge system for a vehicle according to claim 1, wherein the interlock mechanism applied to the first relay and the second relay is provided by a mechanical mechanism.

3. The charge and discharge system for a vehicle according to claim 1, wherein the charge and discharge device further includes an electromagnetic coil connected to the first relay and the second relay and an electromagnetic coil interlock is applied to the electromagnetic coil, the charge and discharge device further includes an operation switch that sets an operation mode of the charge and discharge device to a self-supply mode during which the alternating current power supplied by the electric vehicle is available, and the electromagnetic coil interlock forces the electromagnetic coil to maintain an off state during the self-supply mode of the charge and discharge device.

4. The charge and discharge system for a vehicle according to claim 3, wherein the second relay further includes an auxiliary electric contact as a discharge command interlock, and in a case where the auxiliary electric contact of the second relay is in an off state, the discharge command interlock forbids the electric vehicle from discharging the alternating current power even when the operation switch sets the operation mode to the self-supply mode.

5. The charge and discharge system for a vehicle according to claim 4, wherein the charge and discharge cable includes a connector connected at one end of the charge and discharge cable, the connector includes a discharge start switch and a voltage convert circuit, the discharge start switch outputs a discharge start command when operated by a user, and the voltage convert circuit converts the discharge start command output from the discharge start switch to a voltage signal and transmits the voltage signal to the control unit of the electric vehicle when the operation switch sets the operation mode to the self-supply mode under a condition that the second electric contacts of the second relay are in on states.

6. The charge and discharge system for a vehicle according to claim 5, wherein the connector further includes a connector attachment detection switch that detects an attachment of the connector to the inlet of the electric vehicle, the connector attachment detection switch maintains an off state when the connector is attached to the inlet without being locked and switches to an on state when the connector is locked after being attached to the inlet, the voltage convert circuit converts the discharge start command output from the discharge start switch and an operation state of the connector attachment detection switch to a voltage signal and transmits the voltage signal to the control unit of the electric vehicle when the operation switch sets the operation mode to the self-supply mode under the condition that the second electric contacts of the second relay are in the on states, and the operation state of the connector attachment detection switch is one of the on state or the off state.

7. The charge and discharge system for a vehicle according to claim 1, further comprising:

a power distribution board receiving the alternating current power from the commercial power source; and an alternating current wire connected between the power distribution board and the branch point through the first relay, wherein the charge and discharge device further includes an insulated transformer and a self-supply power electric outlet for supplying the alternating current power supplied by the electric vehicle, a primary side of the insulated transformer is connected to the branch point, one end of a secondary side of the insulated transformer is connected to the self-supply power electric outlet, and an other end of the secondary side of the insulated transformer is grounded, the alternating current power supplied by the electric vehicle is transferred from the branch point to the self-supply power electric outlet through the second electric contacts of the second relay and the insulated transformer, and the alternating current power supplied by the electric vehicle to the self-supply power electric outlet is a single-phase two-wire alternating current power and the single-phase two-wire alternating current power has one wire being grounded.

8. A charge and discharge system for a vehicle comprising:

an electric vehicle including:
  a battery storing a direct current power;
  an inverter converting the direct current power stored in the battery to an alternating current power;
  a control unit controlling the inverter; and
  an inlet through which the alternating current power converted by the inverter is output; and a charge and discharge device electrically connectable with the electric vehicle through a charge and discharge cable, wherein the charge and discharge device receives the alternating current power supplied by the electric vehicle through the charge and discharge cable when electrically connected to the electric vehicle, the charge and discharge device includes a first relay and a second relay, a primary side of the first relay is connected to a commercial power source that supplies an alternating current power to the charge and discharge device, a secondary side of the first relay is connected to a branch point that is positioned between the charge and discharge cable and the first relay, a primary side of the second relay is connected to the branch point, and the second relay receives the alternating current power supplied by the electric vehicle from the branch point, and an interlock mechanism is applied to the first relay and the second relay, and the interlock mechanism prevents one of the first relay or the second relay from being closed when a remaining one of the first relay or the second relay is in a closed state, wherein the first relay includes two first electric contacts that are normally open, the two first electric contacts are connected between the branch point and the commercial power source, the second relay includes two second electric contacts that are normally closed, and the two second electric contacts are connected to the branch point, and wherein the first relay is closed during a charge of the battery included in the electric vehicle with the commercial power source, and the second relay is closed during a discharge of the battery included in the electric vehicle to the external electric loads.

* * * * *